United States Patent [19]
Doyle

[11] Patent Number: 5,426,284
[45] Date of Patent: Jun. 20, 1995

[54] APPARATUS FOR LOCATING AND TRACKING INFORMATION STORAGE ITEMS USING PREDEFINED LABELS

[75] Inventor: Dennis Doyle, Littleton, Colo.

[73] Assignee: Engineered Data Products, Inc., Broomfield, Colo.

[21] Appl. No.: 102,530

[22] Filed: Aug. 4, 1993

Related U.S. Application Data

[63] Continuation of Ser. No. 626,462, Dec. 12, 1990, abandoned.

[51] Int. Cl.⁶ .................................................. G06F 153/00
[52] U.S. Cl. ................................. 235/385; 364/403; 235/375
[58] Field of Search .............. 235/375, 383, 385; 364/403; 283/55

[56] References Cited

U.S. PATENT DOCUMENTS

| | | | |
|---|---|---|---|
| 3,958,102 | 5/1976 | Burt | 235/385 |
| 4,591,983 | 5/1986 | Bennett et al. | 235/385 X |
| 4,639,875 | 1/1987 | Abraham et al. | 235/387 X |
| 5,113,349 | 5/1992 | Nakamura et al. | 235/385 X |
| 5,120,942 | 6/1992 | Holland et al. | 235/375 X |
| 5,159,180 | 10/1992 | Feiler | 235/375 |

*Primary Examiner*—Donald Hajec
*Assistant Examiner*—Edward H. Sirkorski
*Attorney, Agent, or Firm*—James R. Young

[57] ABSTRACT

Disclosed is a labeling and retrieval system that has a storage location label including a prefix area and a location area. The prefix area allows the label to contain information identifying one of several hierarchial levels of storage areas, and also identifies the label as a storage label rather than a media label. The machine readable information on the label is written at an angle that allows a bar code reading device to read only one label, and avoid reading adjacent labels. If the user arranges storage areas into a hierarchy, such as room, aisle, shelf, etc., an individual label may contain location information for more than one level of the hierarchy. The system retains each level of the hierarchy until new information for that level is input to the system or until new information at a higher level is input to the system.

6 Claims, 10 Drawing Sheets

APPARATUS FOR LOCATING AND TRACKING INFORMATION STORAGE ITEMS USING PREDEFINED LABELS

This application is a continuation of application Ser. No. 07/626,462 filed Dec. 12, 1990, now abandoned.

FIELD OF THE INVENTION

This invention relates to information storage systems and more particularly to computerized tracking of storage items. Even more particularly, the invention relates to a computerized system for locating and tracking information storage items, such as magnetic tape media, disk media, or file folders.

BACKGROUND OF THE INVENTION

Large mainframe computer systems typically use a vast quantity of removable magnetic media, for example, tape reels or tape cartridges, for data storage. This media is usually located in a tape library, often separated from the computer room. Many of these large systems have tape management system software that partially automate the task of retrieving tape media for use by the computer system. The tape management system software generates a "pick list" which is given to a tape librarian who goes to the tape library and retrieves the media identified on the pick list. The librarian must take the pick list from the computer room, walk to the tape library, locate the media identified by the pick list, retrieve such media from its storage location, and walk back to the computer room with the media in hand. After the tape is used by the computer system, the librarian must take the tape back to the library and place it into a shelf location.

In most large computer systems tape media is stored in volume serial number order, which requires one shelf location for each tape volume serial number regardless of where the tape is currently located. In these large computer systems, many tapes, typically twenty percent, are stored in an off-site location to provide for data security. Also, many of these large computer systems now have automated tape library systems that store a quantity of tapes in a silo where they can be machine retrieved. The tapes stored in the machine retrievable silo are, of course, removed from the tape library while stored in the silo, and leave empty shelf space. Because of the off-site and machine retrievable silo storage, large quantities of library shelf space would be empty if the library reserved a shelf location for each tape. Therefore, a method is needed to easily separate the location of a tape in the library from its volume serial number.

If the tape media is not being stored in sequential location by tape volume serial number, each time a tape is placed back into the library the librarian must enter the location into which the tape is being placed. This requires manual entry of a shelf location by a librarian whose hands are full of tapes being placed into the library, and it requires that the manual entry be done while the librarian is in the library shelf storage area, not at a fixed location where a terminal is available.

Even if the librarian's hands are free, manual entry of the tape location is still subject to key entry error. Even a one percent error rate, in a library with a million volumes, would result in ten thousand lost tapes.

Similar problems exist with file folders in a typical office. Many offices today are storing important file folders at a secure off-site location. Also, inventory of file folders, because of the quantity involved, is much more difficult than tape media inventory.

There is need in the art then for a system to improve the reliability and efficiency of identifying the location of tapes in a tape library. There is a further need for such a system that automatically determines a storage location for a tape or file folder. The present invention meets these needs.

SUMMARY OF THE INVENTION

It is an aspect of the present invention to assist a user, such as a librarian or a tape librarian in a computer installation, in locating data storage media such as magnetic tape, disk or file folders and to assist them in storing such media back into the library.

Another aspect is to electronically read a label attached to the storage area where the media is stored.

Still another aspect is to provide a storage area labeling system that provides for a hierarchy of storage areas, each of which may contain several storage locations.

Another aspect is to provide such a labeling system wherein each storage location label includes prefix information that identifies the label as a storage location label.

Another aspect is to provide such a labeling system that allows multiple levels of the storage hierarchy to appear on a single storage location label.

A further aspect is to provide a storage label that can be read without reading interfering information from adjacent labels.

A still further aspect is to provide machine readable information on the label at an angle that allows a reading device to read information only from a single label.

The above and other aspects of the invention are accomplished in a labeling and retrieval system that has a storage location label including a prefix area and a location area. The prefix area allows the label to contain information identifying one of several hierarchial levels of storage areas, and also identifies the label as a storage label rather than a media label. Because of the tight space requirements for placing a label below a tape media storage location, the machine readable information on the label is written at an angle that allows a bar code reading device to read only one label, and avoid reading adjacent labels.

The location area of the label contains identifying characters that identify the location in which the media is stored. In addition, if the user arranges storage areas into a hierarchy, such as room, aisle, shelf, etc., an individual label may contain location information for more than one level of the hierarchy. For example, a label placed on a shelf of an aisle within a particular room might contain the number of the room, the number of the aisle, and the number of the shelf. This allows a librarian to re-read all the storage information whenever they change shelves or aisles. Also, the system retains each level of the hierarchy until new information for that level is input to the system or until new information for a higher level is input to the system. For example, when a librarian reads a room label as they enter a room, the librarian may move from aisle to aisle within the room and read a new aisle label with each move. The system would retain the room label while updating the aisle information each time a new aisle label is read.

If the location label information stored in the system does not have at least the highest level when a librarian reads a media volume label, the system will indicate an error telling the librarian that more complete location information must be entered before the volume information will be accepted.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
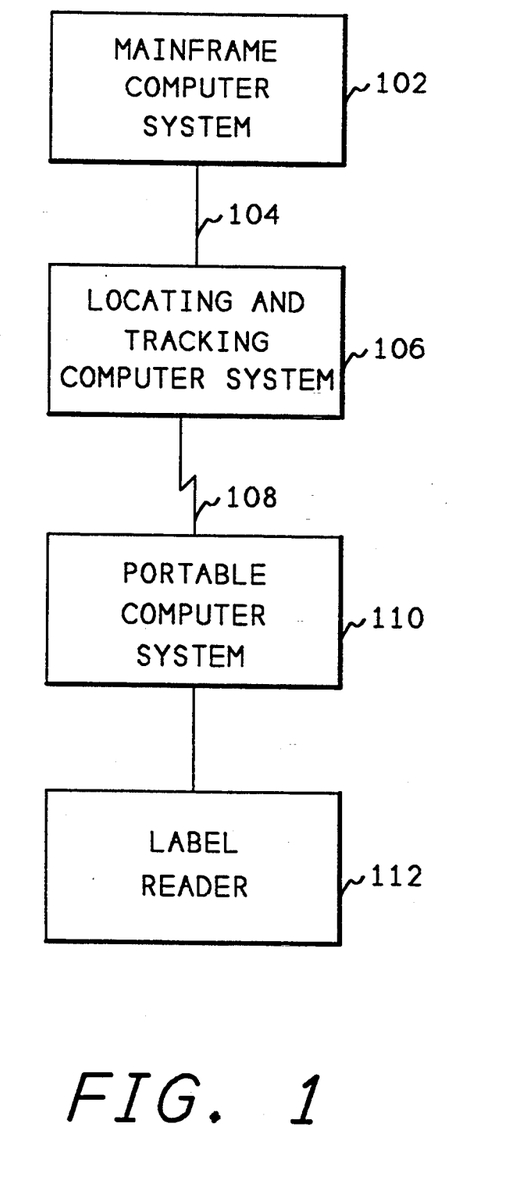
FIG. 1 shows an overall block diagram of the computerized portion of the system of the present invention.

FIG. 1 shows a block diagram of the environment of the information locating and tracking system of the present invention. Referring now to FIG. 1, a mainframe computer system 102 makes a request to retrieve a media item through a tape management software system contained within the mainframe computer system 102. This request is in the form of a pick list, which is sent to the media locating and tracking computer system 106 over a communications link 104. The tracking computer system 106 transmits a retrieve request to the portable computer system 110 over a radio frequency transmit/receive link 108. The portable computer system 110 displays a message to the tape librarian requesting that the particular media item be retrieved, and after retrieving the item, a media label reader 112 electronically reads the media identification on the media item, sending this information to the portable computer system. The portable computer system 110 then sends a message over the RF link 108 back to the tracking computer system 106 identifying that the media item has been retrieved. The tracking computer system 106 then sends a message to the mainframe computer system 102 over the communications link 104 that the media item is available for use.

When a tape is stored back into the library, the librarian uses the label reader to read a location label under the storage location for the tape. Then the librarian places the tape into the storage location and reads the tape label. The portable computer system 110 then sends the tape volume serial number from the tape label and the location information from the location label to the locating and tracking computer 106 where the information is stored in a data base for use when the tape needs to be retrieved.

Although the portable computer system 110, using an RF link for communication is the preferred embodiment, it is not required. The label reader 112 could be attached directly to the locating and tracking computer system 106.

Figure 2:
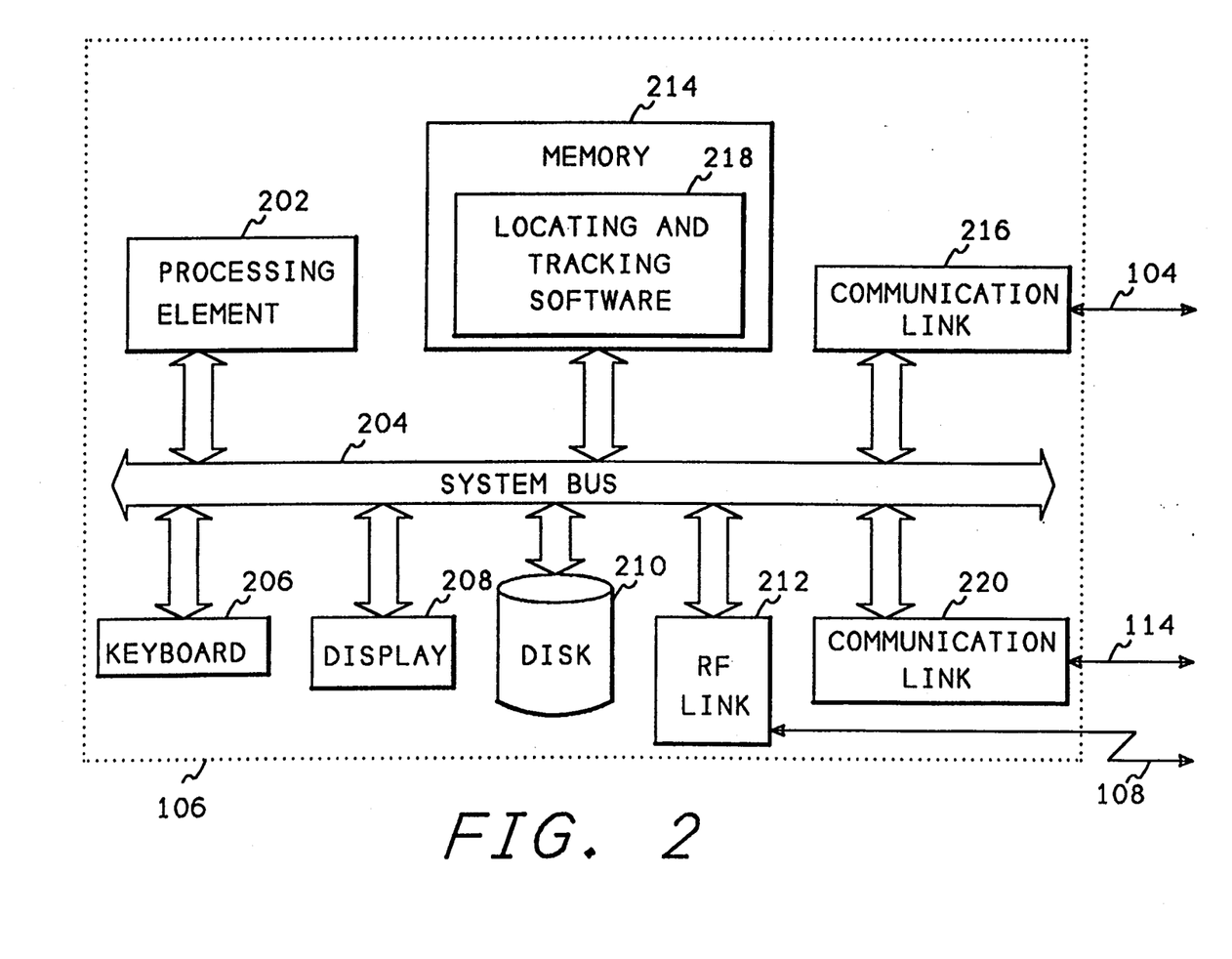
FIG. 2 shows a block diagram of the locating and tracking computer system of FIG. 1.

FIG. 2 shows a block diagram of the hardware of the media locating and tracking computer system 106 (FIG. 1) of the present invention. Referring now to FIG. 2, the tracking computer system 106 contains a processing element 202 which communicates with other components of the system through a system bus 204. A keyboard 206 is used to allow data input directly to this computer, and a display 208 is used to display information to an operator of this computer. A disk 210 is used to store the software of the present invention, as well as the databases containing data for the media items. An RF link controller 212 is used to transmit information to the portable computer system 110 over the radio frequency link 108. A communications link controller 216 is used to receive and transmit information to the mainframe computer system 102 over the communications interface 104. A memory 214 within the tracking computer system 106 is used to contain the locating and tracking software 218 as well as temporary data storage for the database. A communication link 220 is used to send and receive information to and from an off-site computer system for tracking tapes that are stored off-site.

Figure 3:
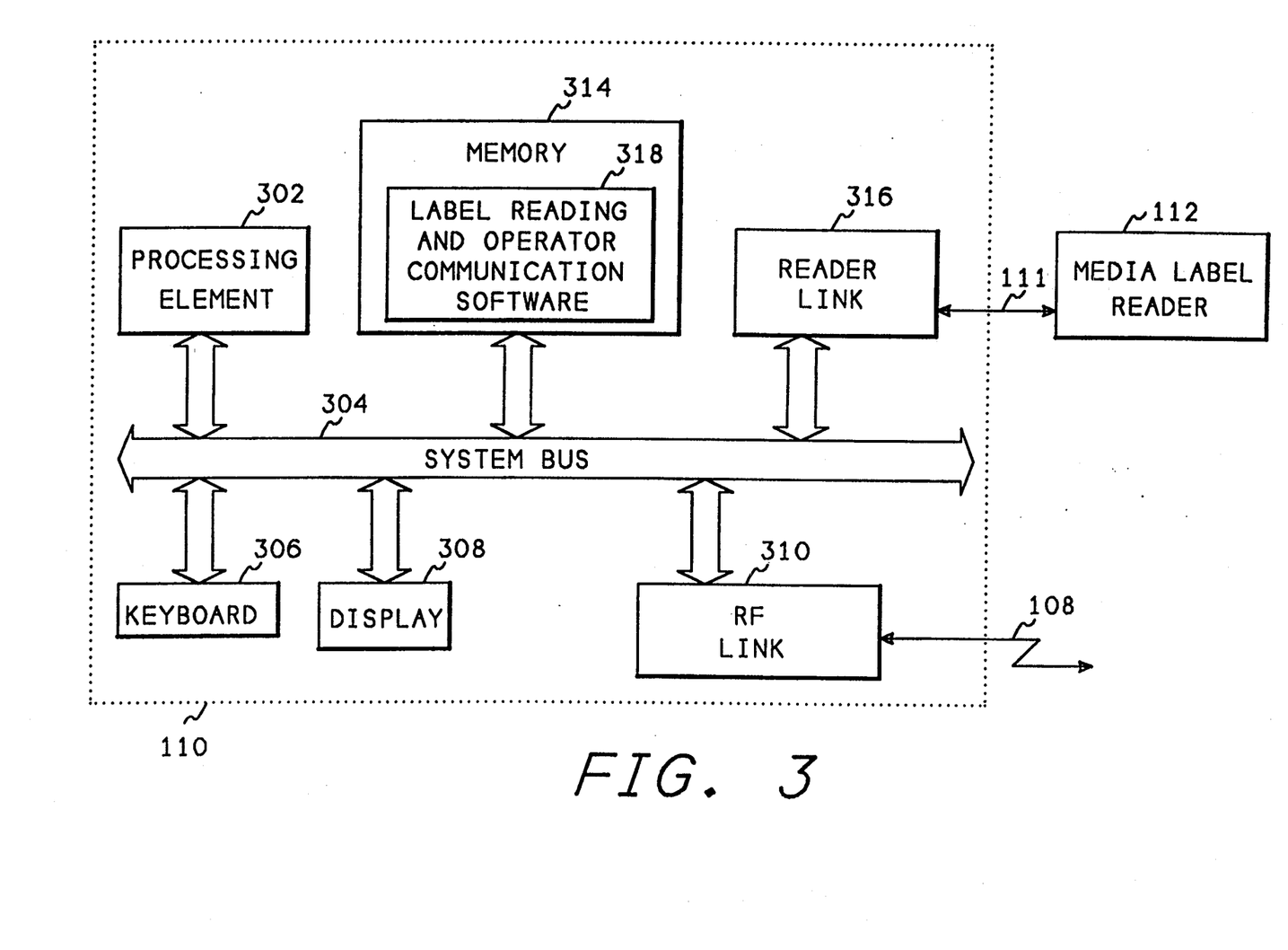
FIG. 3 shows a block diagram of the portable computer system of FIG. 1.

FIG. 3 shows a block diagram of the hardware of the portable computer system 110 of the present invention. Referring now FIG. 3, the portable computer system 110 contains a processing element 302 which communicates to other components of the system through a system bus 304. A keyboard 306 is used by the librarian to enter information directly into the system 110, and a display 308 is used to display messages to the librarian. An RF link controller 310 is used to receive and transmit messages to the tracking computer system 106 over the radio frequency link 108. A reader link controller 316 is used to received information from the media label reader 112 through an attached cable 111. A memory 314 is used to contain the label reading and operator communications software 318.

Figure 4:
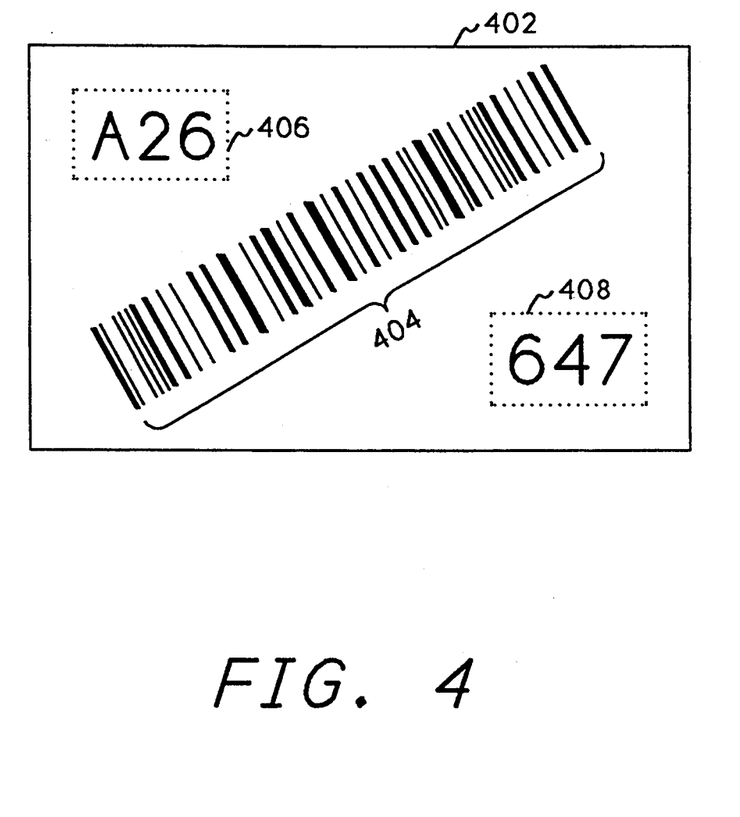
FIG. 4 shows a storage area label.

FIG. 4 shows a storage location label. Referring now to FIG. 4, a label 402 contains a machine-readable bar code 404 and a human-readable code, which is divided between the dashed areas 406 and 408. The machine-readable bar code 408 is an ANSI standard bar code, such as three of nine or one twenty eight.

The width of a slot for storing a typical tape cartridge is approximately one-half inch, therefore, the label of FIG. 4 must be of a very small size. A typical bar code reading device emits a laser light beam which spans several inches and can read a bar code anywhere within this several inch span. Therefore, placing the bar code horizontally on a label would allow a bar code reader to potentially read several different labels at one time. This would cause confusion within the computerized system as to which label applied to the storage area being referenced. Therefore, the label of FIG. 4 places the bar code at an angle. This also requires that the bar code reader be placed at an angle in order to read the label. Because of this angle, which is typically twenty to thirty degrees (20°-30°), the bar code reading beam will read only a single label located under a tape storage slot.

Because the label is very small, and because of the angle of the bar code, the human-readable portion of the label must be divided into two areas, 406 and 406.

Figure 5:
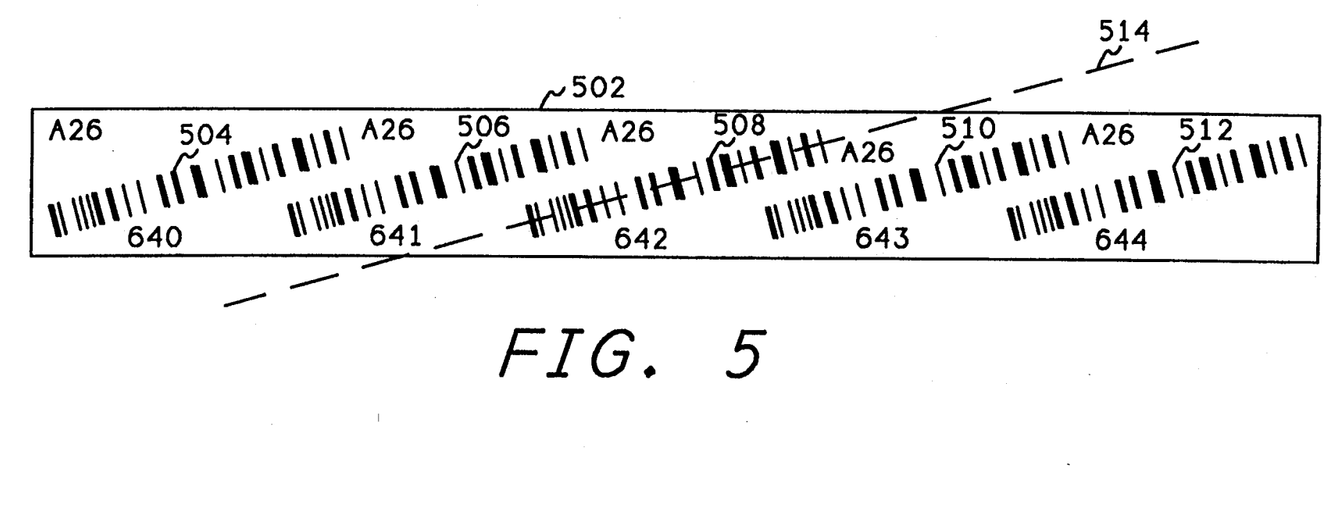
FIG. 5 shows a storage area label for multiple storage locations and illustrates the placement of the machine readable portion to avoid reading adjacent labels.

FIG. 5 shows a storage location label for multiple storage locations and illustrates the placement of the machine-readable portion to avoid reading adjacent labels. Referring now to FIG. 5, a label 502 contains multiple machine-readable bar codes, here illustrated by areas 504, 506, 508, 510, and 512, each of which represents a single storage location. Therefore, the label 502 would be placed under five storage locations. Because of the small width of the storage slots, the bar code areas are overlapped. Thus, the right-hand end of bar code area 504 overlaps the left-hand end of bar code area 506, etc. The dashed line 514 indicates the width of a light beam used in a typical bar code reading device, and shows that the width of the light beam is much larger than the width of a bar code for a single storage location. However, because of the angle of the bar codes, the line 514 crosses only a single bar code, thus the bar code reading device would read only a single label, and the correct storage location information would be input to the computerized portion of the system.

Figure 6:
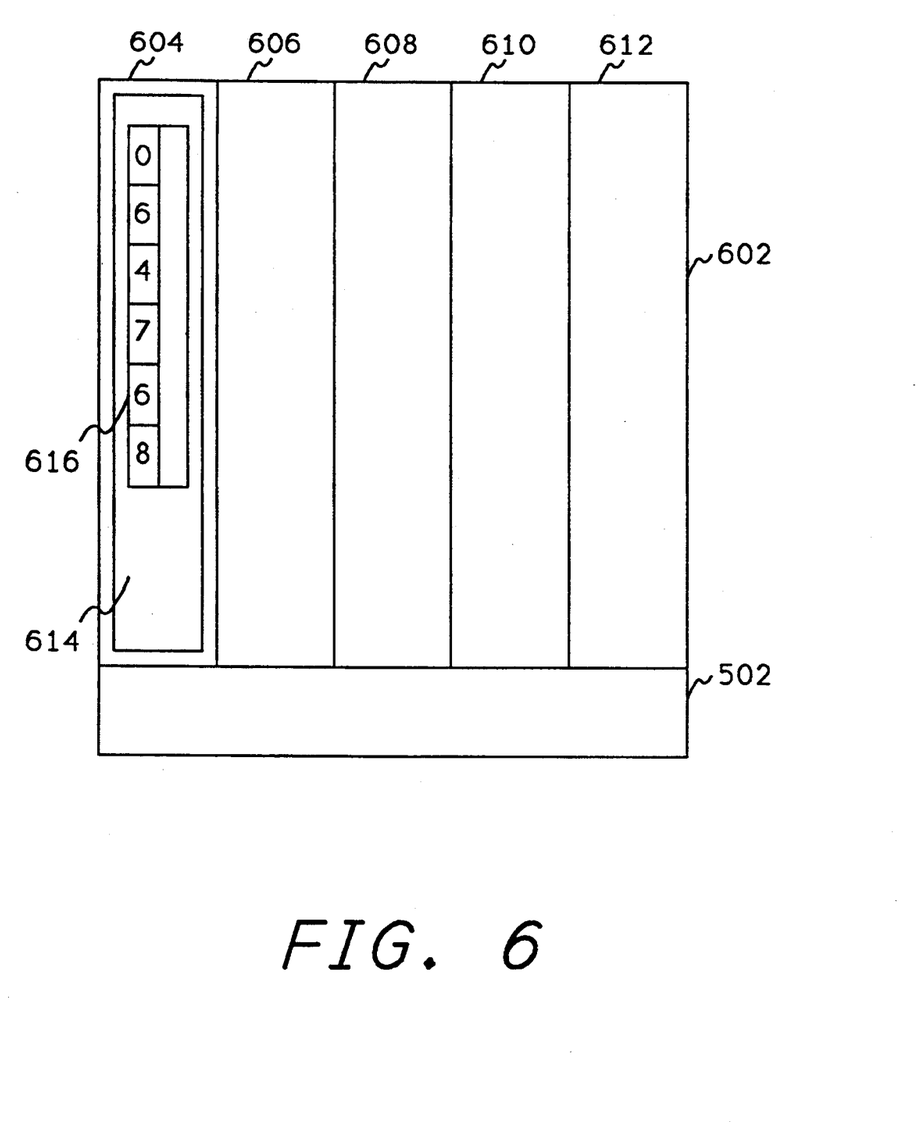
FIG. 6 shows a diagram of a tape storage area and depicts the placement of the label of FIG. 5 within the tape storage area.

FIG. 6 shows a diagram of a tape storage area and depicts the placement of the label of FIG. 5 within the tape storage area. Referring now to FIG. 6, a tape storage area 602 contains five storage locations 604, 606, 608, 610, and 612. A tape 614 having a tape media label 616 is shown stored in the location 604. The label 502 is shown placed at the bottom of the tape storage area 602 and illustrates that each one of the bar codes depicted in FIG. 5 is identified with one of the tape storage locations in the tape storage area 602.

The system of the present invention allows a user of the system to organize their storage into a hierarchy of storage areas. For example, a user might have multiple tape storage vaults, each containing several aisles used for storing tapes. Furthermore, tapes may be stored in units of twenty, called a twenty-pack, and these twenty-packs placed at a particular location on shelves within each aisle. Therefore, the hierarchy identifying the location of a particular tape would include vault, aisle, X-Y location (i.e. horizontal position and shelf) of the twenty-pack, and slot within the twenty-pack.

To accommodate this hierarchial storage arrangement, the storage labels of FIGS. 4 and 5 contain a prefix area and a location area. The prefix area identifies the level of the hierarchy, and the location area identifies the storage area location within the hierarchy. In the preferred embodiment of the present invention, an alphabetic sequence of at least one letter is used as the prefix. In addition, a separator character is used between the letters and the location area value. Therefore, the highest level of the hierarchy, for example, the tape vault as described above, would have a prefix of A followed by a period. The next level of the hierarchy, for example, the aisle as described above, would have the letter B followed by a period. The X-Y location within the aisle would have a C and a period. Because of space limitations within a twenty-pack storage container, the fourth hierarchial level contains only the period character and does not include an alphabetic character. In other embodiments, an alphabetic letter could, of course, be included at this fourth level. In addition to identifying the hierarchial level, the prefix also identifies the label as being a location label, as opposed to a volume serial label on the media. Therefore, when the bar code reading device used with the present invention reads a label that contains a prefix area as well as other information, the system knows that the label is a location label and not a volume serial label.

Figure 7:
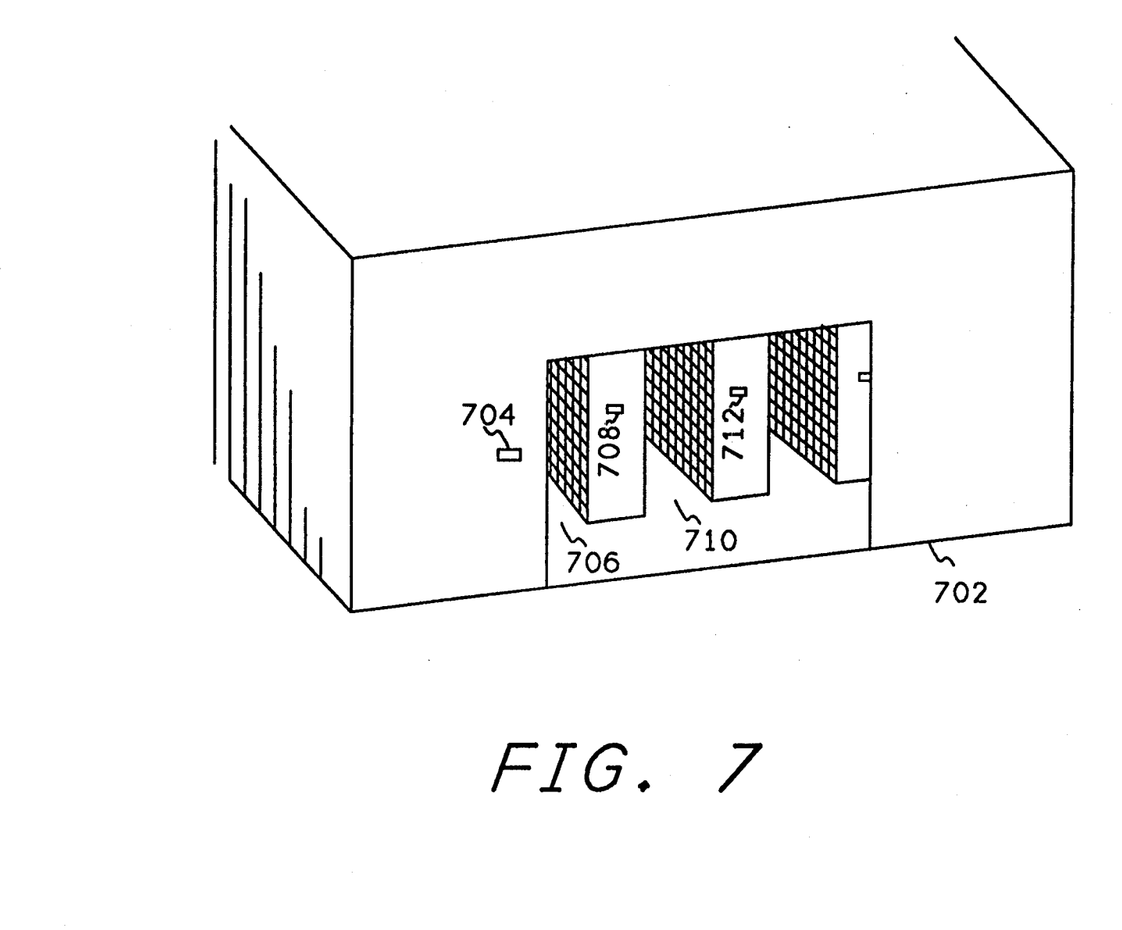
FIG. 7 shows a diagram of a tape storage library and indicates how the storage area labels could be placed.

FIG. 7 shows a diagram of a tape storage library and indicates how the storage area labels could be placed. Referring now to FIG. 7, a tape storage vault 702 has a label 704 located beside the door used for entering the vault. As described above with respect to the preferred embodiment, the label 704 would have a prefix of "A." and a location value, for example "000001". An aisle 706 within the vault 702 has a label 708 located at the end of the aisle 706. In the preferred embodiment, the label 708 would have a prefix "B." followed by a location value. A second aisle 710 has a second aisle label 712 also located at its end. The label 712 would also have a prefix of "B.", since both aisles are at the second level in the storage hierarchy. Of course, this aisle would have a location value different from that of the first aisle. Within each aisle, each location used for storing a twenty-pack would have a label with a prefix of "C.", and an X-Y location value, located beneath the storage area. Furthermore, for each twenty-pack stored in an aisle within the storage area, each slot of the twenty-pack would have a label with a prefix of "." and a storage location value, called a slot number.

When a librarian is placing tapes into a storage area, the librarian would use the bar code reading device to read the label 704 as the librarian entered the vault 702. As the librarian entered aisle 710, the librarian would read the label 712. The computer system would retain the vault ID contained on label 704 and would add the aisle information from label 712. As the librarian reached the twenty-pack where the tape was to be stored, the librarian would read the label below the twenty-pack, thus giving the computer the X-Y location of the twenty-pack. Then the librarian would read the storage location slot within the twenty-pack pack where the tape is to be placed and then place the tape within the slot. After placing the tape in the slot, the librarian would read the machine-readable label contained on the tape, thus completing the sequence and causing the computer system to store the tape volume serial along with the vault, aisle, X-Y, and slot location of the tape in the data base on the locating and tracking computer system 106. When the tape needs to be retrieved, the computer system 106 would print out the vault, aisle, X-Y, and slot location allowing the librarian to easily move to the location and retrieve the tape. If the librarian fails to read any of the location labels before reading the tape label, the system would indicate an error to the librarian, since it would be unable to completely identify the slot location where the tape was being stored.

An additional feature of the invention would assist the librarian as the librarian moves from location to location within a tape storage area. This feature allows multiple location values to be stored on a particular label. In the preferred embodiment of the present invention, a location value has six characters of information. Therefore, if the location value on a label contains more than six characters, the system knows that additional location value information is present. The system uses this additional location information as the location value for the next level in the hierarchy. For example, label 708 might contain a prefix of "A." and further contain six characters identifying the vault, followed by six more characters identifying the aisle. Because the prefix started with the vault prefix, the computer system would know that the first six characters identify the particular vault, and the second six characters identify the particular aisle.

Another way in which this could be used is to have every X-Y label also contain the aisle information. Therefore, as a librarian moved from aisle to aisle, the librarian would not need to walk to the end of the aisle to read a new aisle label. The librarian would only need to read a new X-Y location label, since the X-Y label also contains the aisle in which the X-Y location is contained.

Figure 8:
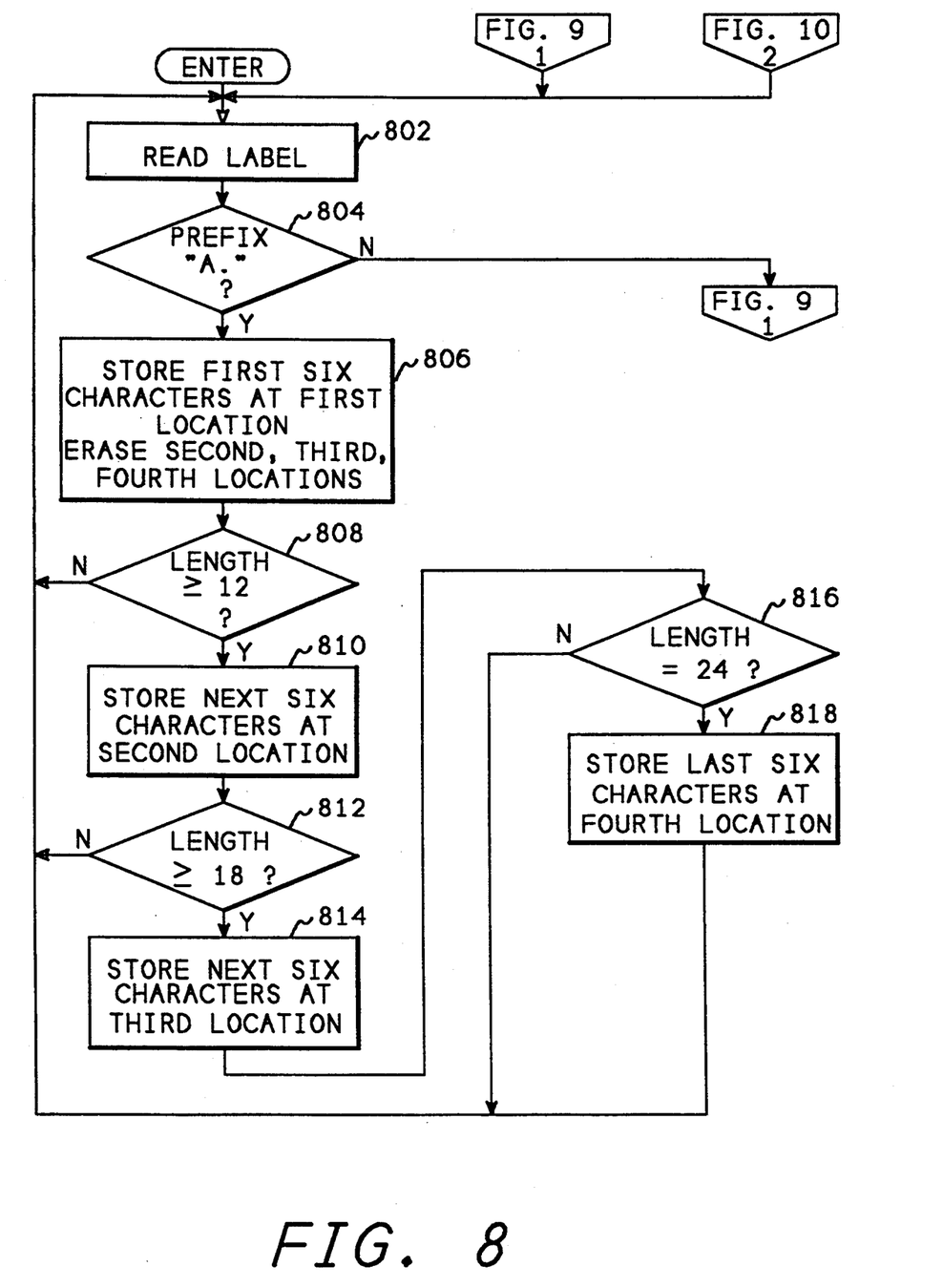
FIGS. 8, 9, and 10 shows a flowchart of the label reading software in the present invention.
Figure 9:
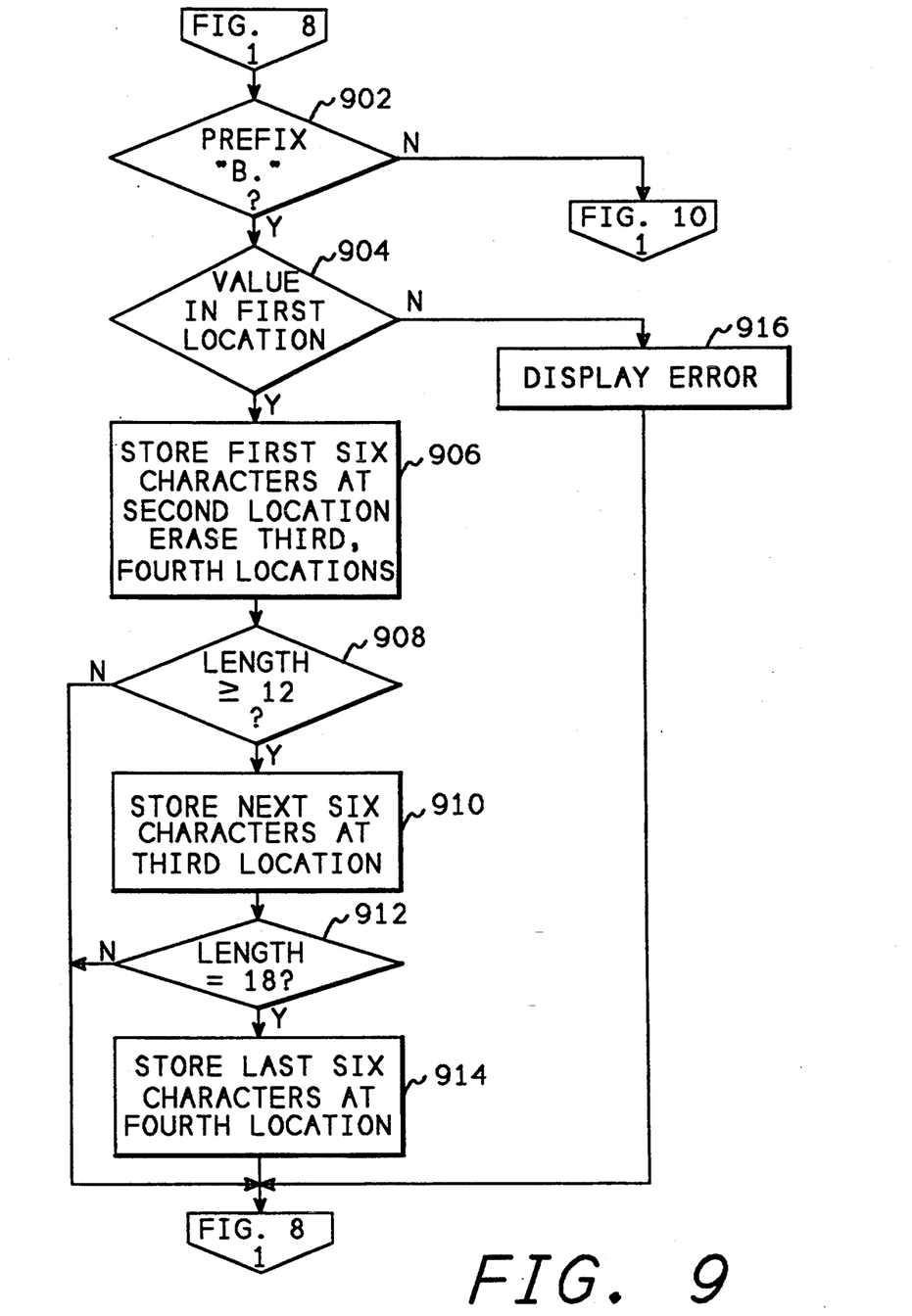
Figure 10:
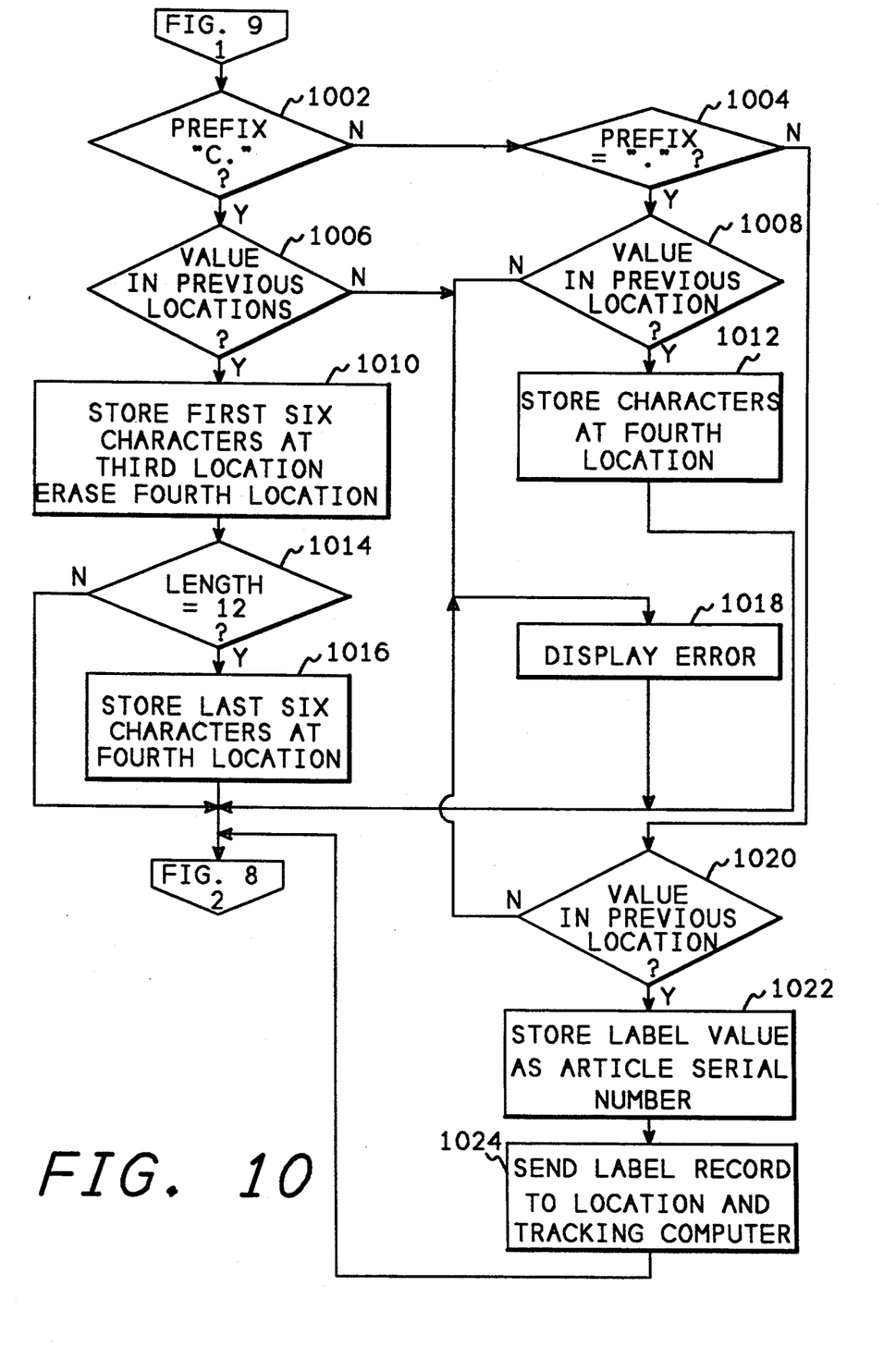

FIGS. 8, 9, and 10 show a flowchart of the label-reading software contained within the portable computer system 110 of the present invention. Referring now to FIGS. 8, 9, and 10, after entry, block 802 causes the label reader 112 (FIG. 1) to read a label. The label reader 112 is a bar code reading device which is activated by a triggering device contained on a handle of the bar code reading device. Thus, the computer system 110 will remain at block 802 until the librarian triggers the label-reading device in the process of reading a label. Once a label is read, block 802 transfers to block 804 which determines whether the label has a prefix of "A.". If the label does not have that prefix, or has no prefix at all, block 804 transfers to FIG. 9. If the label does contain a prefix of "A.", block 804 transfers to block 806 which stores the first six characters contained on the label as the first location value. Block 806 then erases the second, third, and fourth location values, since the librarian has moved to a new location at this level in the hierarchy. This erasure prevents the system from erroneously storing false information should the librarian fail to read lower level labels at the new location before reading a tape volume serial label. Block 808 then determines whether the length of the location information on the label is greater than or equal to twelve. If the length is not greater than or equal to twelve, the label contains only a single location value, and block 808 transfers back to block 802 to read the next label. If the length is greater than or equal to twelve, block 808 transfers to block 810 which stores the next six characters as the location value for the location of the second level in the hierarchy. Block 812 then determines whether the length of the location information is greater than or equal to eighteen, and if not, block 812 transfers back to block 802. If the length is greater than or equal to eighteen, block 812 transfers to block 814 which stores the next six characters on the label as the third hierarchy level location value. Block 816 then determines whether the length is equal to twenty-four, and if not, returns to block 802. If the length is equal to twenty-four, block 818 stores the last six characters in the label as the fourth hierarchy level location value, and then returns to block 802.

If the prefix is not equal to "A.", block 804 transfers to FIG. 9, block 902. Block 902 determines whether the prefix is "B.", and if it is, block 902 transfers to block 904 which determines whether the first location already contains a value. Since the value in the label just read is for the second location, the system requires that the first location already have a value, and if it does not, block 904 transfers to block 916 which displays an error before returning to block 802 on FIG. 8. If the first location does have a value, block 904 transfers to block 906 which stores the first six characters of this label as the second location value, and then erases the third and fourth location values. Block 908 then determines whether the length of the label information is greater than or equal to twelve and if not, block 908 returns to FIG. 8, block 802.

If the length is greater than or equal to twelve, block 908 transfers to block 910 which stores the next six characters on the label, as the third location value. Block 912 then determines whether the length is equal to eighteen, and if not, it returns to FIG. 8. If the length is equal to eighteen, block 912 transfers to block 914 which stores the last six characters on the label as the fourth location value.

If the prefix for this label was not equal to "B.", block 902 transfers to FIG. 10, block 1002. Block 1002 determines whether the prefix for the label is "C.", and if it is, block 1002 transfers to block 1006 which determines whether there are values in the first and second locations. If there are not values in both the first and second locations, block 1006 transfers to block 1018 which displays an error before returning to FIG. 8. If the previous locations do have values, block 1006 transfers to block 1010 which stores the first six characters of this label as the third location value, and then erases the fourth location value. Block 1014 then determines whether the length of the label information is equal to twelve, and if not, returns to FIG. 8. If the length is equal to twelve, block 1014 transfers to block 1016 which stores the last six characters of the label as the fourth location value before returning to FIG. 8.

If the prefix of this label is not equal to "C.", block 1002 transfers to block 1004 which determines whether the prefix is equal to".". If the prefix is equal to ".", block 1004 transfers to block 1008 which determines whether the first, second, and third locations all have values. If at least one of the previous locations does not have a value, block 1008 transfers to block 1018 which displays an error before returning to FIG. 8. If all the locations do have values, block 1008 transfers to block 1012 which stores the characters of the label as the fourth location value before returning to FIG. 8.

If block 1004 determines that the label does not have a prefix value, block 1004 transfers to block 1020 which determines whether the first location has a value, and if it does not, block 1020 transfers to block 1018 which displays an error before returning to FIG. 8. If at least the first location does have a value, block 1020 transfers to block 1022 which stores the label value as the tape volume serial number. Block 1024 then sends a label record, which includes the four location values as well as the tape volume serial number to the location and tracking computer 106 over the radio frequency link 108. The location and tracking computer system then stores this information in the data base. Block 1024 then returns to FIG. 8, block 802 to read the next label.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A system for tracking the location of a plurality of portable articles, said system comprising:
   a machine readable locator label affixed to a location for storing at least one of the articles, said locator label having a label value comprising
   a prefix identifying said label as a locator label, and
   a plurality of location values, each identifying a location within one of a hierarchy of levels of locations wherein a first of said plurality of location values comprises a location value of a location within a level in said hierarchy of levels of locations identified by said prefix identifier value, and further wherein each subsequent location value comprises a location value for a location within a successive lower level in said hierarchy of levels of locations, and wherein said prefix contains one of a plurality of prefix identifier values, each representing a level of said hierarchy of levels of locations;
   a machine readable article serial number label affixed to said article, said label having a serial number value identifying said article;
   means for reading said machine readable labels; and
   means for storing and retrieving a data record containing said location values and said article serial number value read from said machine readable labels.

2. The system of claim 1 further comprising means for retaining each of said location values for said hierarchy of levels of locations when multiple labels are read in hierarchy sequence.

3. The system of claim 2 further comprising means for indicating an error when said locator labels are not read in hierarchy sequence.

4. The system of claim 1 wherein said prefix identifier values comprise an alphabetic sequence and further wherein each prefix identifier value in said alphabetic sequence represents a different level in said hierarchy of levels of locations.

5. The system of claim 1 wherein said location and serial number label values each comprise six characters.

6. A system for tracking the location of a plurality of portable articles, said system comprising:
   a machine readable locator label affixed to a location for storing at least one of the articles, said locator label having a label value comprising
   a prefix identifying said label as a locator label, wherein said prefix contains one of a plurality of prefix identifier values, each representing a level of a hierarchy of levels of locations,
   a separator for separating said prefix from data following said prefix, and
   a plurality of location values, each identifying a location within one of said hierarchy of levels of locations, and wherein a first of said plurality of location values comprises a location value for a location within one level in said hierarchy of levels of locations identified by said prefix identifier value, and further wherein each subsequent location value comprises a location value for a location in a successive lower level in said hierarchy of levels of locations;
   a machine readable article serial number label affixed to said article, said label having a serial number value identifying said article;
   means for reading said machine readable labels; and
   means for storing and retrieving a data record containing said location value and said article serial number value read from said machine readable labels.

* * * * *